US012626839B2

(12) United States Patent
Matsumura et al.

(10) Patent No.: US 12,626,839 B2
(45) Date of Patent: May 12, 2026

(54) ELECTRICALLY INSULATED CABLE

(71) Applicant: Sumitomo Electric Industries, Ltd., Osaka (JP)

(72) Inventors: Yutaka Matsumura, Osaka (JP); Shigeyuki Tanaka, Osaka (JP); Taro Fujita, Osaka (JP); Takumi Ooshima, Kanuma (JP); Jo Yagisawa, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 565 days.

(21) Appl. No.: 17/773,140

(22) PCT Filed: Aug. 3, 2020

(86) PCT No.: PCT/JP2020/029653
§ 371 (c)(1),
(2) Date: Apr. 26, 2024

(87) PCT Pub. No.: WO2021/084829
PCT Pub. Date: May 6, 2021

(65) Prior Publication Data
US 2024/0282480 A1 Aug. 22, 2024

(30) Foreign Application Priority Data

Oct. 30, 2019 (JP) ................................. 2019-197608

(51) Int. Cl.
*H01B 7/18* (2006.01)
*B60T 13/74* (2006.01)
(Continued)

(52) U.S. Cl.
CPC ............ *H01B 7/1875* (2013.01); *B60T 13/74* (2013.01); *H01B 7/292* (2013.01); *H01B 7/38* (2013.01); *B60T 2270/10* (2013.01)

(58) Field of Classification Search
CPC .......... H01B 7/02; H01B 7/17; H01B 7/1855; H01B 7/1875
See application file for complete search history.

(56) References Cited

U.S. PATENT DOCUMENTS 4,317,000 A * 2/1982 Ferer ...................... H01B 7/182
385/104
2007/0187134 A1 8/2007 Detian et al.
(Continued)

FOREIGN PATENT DOCUMENTS

CN 106205833 A 12/2016
JP 5-23320 U 3/1993
(Continued)

OTHER PUBLICATIONS

Notice of Allowance issued in U.S. Appl. No. 17/773,237 mailed Feb. 3, 2025.
(Continued)

*Primary Examiner* — Sherman Ng
(74) *Attorney, Agent, or Firm* — McCarter & English, LLP; Michael A. Sartori

(57) ABSTRACT
An electrically insulated cable comprising: a core electric wire; a tape member covering the core electric wire; and a covering layer covering the tape member, wherein: the core electric wire includes a plurality of insulated electric wires; the insulated electric wires each include a conductor and an insulating layer covering the conductor; the tape member is a film; and the tape member has a breaking elongation of 50% or less.

9 Claims, 3 Drawing Sheets

(51) Int. Cl.
H01B 7/29 (2006.01)
H01B 7/38 (2006.01)

(56) References Cited

U.S. PATENT DOCUMENTS

| | | |
|---|---|---|
| 2010/0218970 A1 | 9/2010 | Eshima |
| 2011/0036613 A1 | 2/2011 | Hayashishita et al. |
| 2013/0240244 A1* | 9/2013 | Honda ................... H01B 3/306 |
| | | 174/119 C |
| 2013/0264112 A1 | 10/2013 | Xu et al. |
| 2014/0326480 A1 | 11/2014 | Hashimoto et al. |
| 2015/0017441 A1* | 1/2015 | Yaguchi .................. C08L 23/06 |
| | | 524/451 |
| 2015/0096785 A1 | 4/2015 | Hayashishita et al. |
| 2015/0165988 A1 | 6/2015 | Hayakawa et al. |
| 2016/0155540 A1 | 6/2016 | Matsuda et al. |
| 2017/0263353 A1 | 9/2017 | Hayakawa et al. |
| 2018/0114610 A1* | 4/2018 | Uegaki ................... H01B 7/18 |
| 2019/0355492 A1* | 11/2019 | Uegaki .................. H01B 11/12 |
| 2020/0168359 A1 | 5/2020 | Kohori et al. |
| 2023/0094637 A1 | 3/2023 | Murayama et al. |

FOREIGN PATENT DOCUMENTS

| | | | |
|---|---|---|---|
| JP | H8-235937 | A | 9/1996 |
| JP | 2000-204213 | A | 7/2000 |
| JP | 2004-311164 | A | 11/2004 |
| JP | 3145846 | U | 10/2008 |
| JP | 2010-047759 | A | 3/2010 |
| JP | 2014-93203 | A | 5/2014 |
| JP | 2014-220043 | A | 11/2014 |
| JP | 2015-156386 | A | 8/2015 |
| JP | 2016-100198 | A | 5/2016 |
| JP | 2017-162644 | A | 9/2017 |
| JP | 2017-224434 | A | 12/2017 |
| JP | 2019-079812 | A | 5/2019 |

OTHER PUBLICATIONS

Office Action issued in U.S. Appl. No. 17/773,237 dated Jan. 19, 2024.

Notice of Allowance issued in U.S. Appl. No. 17/773,237 dated Sep. 25, 2024.

Notice of Allowance issued in U.S. Appl. No. 17/773,237 mailed Jul. 3, 2024.

U.S. Appl. No. 17/773,237, filed Apr. 29, 2022.

* cited by examiner

ELECTRICALLY INSULATED CABLE

TECHNICAL FIELD

The present disclosure relates to an electrically insulated cable. The present application claims priority of Japanese Patent Application No. 2019-197608 filed on Oct. 30, 2019, the contents of which are hereby incorporated by reference in its entirety.

BACKGROUND ART

Electric parking brake (EPB) systems to be mounted on vehicles each use an electrically insulated cable (a cable for EPB) that electrically connects a caliper in a wheel house and an electronic control unit on the body side of a vehicle.

CITATION LIST

Patent Literature

PTL 1: Japanese Patent Laying-Open No. 2015-156386
PTL 2: Japanese Patent Laying-Open No. 2017-162644

SUMMARY OF INVENTION

The electrically insulated cable according to the present disclosure is an electrically insulated cable comprising:
a core electric wire;
a tape member covering the core electric wire; and
a covering layer covering the tape member;
wherein:
the core electric wire includes a plurality of insulated electric wires;
the insulated electric wires each include a conductor and an insulating layer covering the conductor;
the tape member is a film; and
the tape member has a breaking elongation of 50% or less.

DETAILED DESCRIPTION

Figure 1:
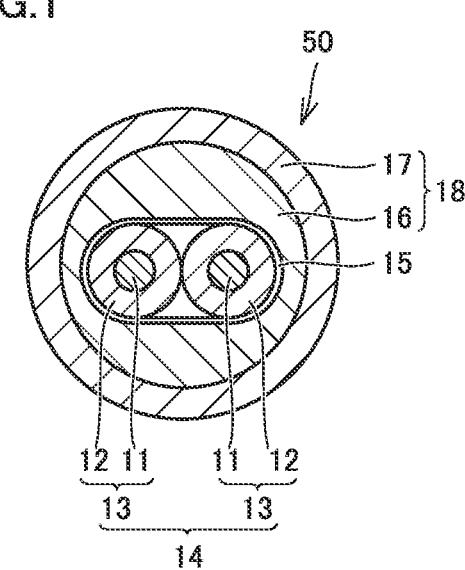
FIG. 1 is a cross-sectional view showing a configuration of an embodiment of the electrically insulated cable of the present disclosure.

Problem to be Solved by the Present Disclosure

Japanese Patent Laying-Open No. 2015-156386 (PTL 1) discloses an electrically insulated cable comprising: a core electric wire formed by twisting a plurality of core materials including a conductor and an insulating layer formed so as to cover the conductor; a first covering layer formed so as to cover the core electric wire; a second covering layer formed so as to cover the first covering layer; and a tape member arranged, between the core electric wire and the first covering layer, in a state of winding around the core electric wire; wherein: the second covering layer is formed of a flame-retardant polyurethane-based resin, and the cross-sectional area of each of the conductors is in the range of 0.18 to 3.0 mm².

Japanese Patent Laying-Open No. 2017-162644 (PTL 2) discloses a composite cable comprising: a first pair twisted wire formed by twisting a pair of first electric wires each having a first central conductor and a first insulator covering the first central conductor on the outer circumference thereof; a second pair twisted wire formed by twisting a pair of second electric wires each having a second central conductor and a second insulator covering the second central conductor on the outer circumference thereof; a pair of third electric wires that each have a third central conductor having a cross-sectional area larger than the first central conductor and the second central conductor and a third insulator covering the third central conductor on the outer circumference thereof, that each have an outer diameter larger than the first electric wire and the second electric wire, and that each are arranged between the first pair twisted wire and the second pair twisted wire in the outer circumference direction; and a tape member wound spirally around an assembly formed by twisting together the first pair twisted wire, the second twisted wire and the pair of the third electric wire; wherein: the twisting directions of both the pair twisted wires are the same as each other, the twisting directions of both the pair twisted wires are different from the twisting direction of the assembly, and the twisting direction of the assembly is different from the winding direction of the tape member.

The tape member of each of PTL 1 and PTL 2 is formed of paper, a nonwoven fabric or the like. Therefore, when the covering layer and the tape member are removed by inserting a blade to expose the core material (insulated electric wire), the tape member is sometimes decomposed into pieces and scattered around. Under these circumstances, it has been required to improve workability in exposing an insulated electric wire.

The present disclosure has been made in view of the above circumstances, and an object of the present invention is to provide an electrically insulated cable excellent in workability in exposing an insulated electric wire.

Advantageous Effect of the Present Disclosure

According to the present disclosure, it is possible to provide an electrically insulated cable excellent in workability in exposing an insulated electric wire.

DESCRIPTION OF EMBODIMENTS

First, implementations of the present disclosure will be listed and described.

[1] The electrically insulated cable according to one aspect of the present disclosure is an electrically insulated cable comprising:
a core electric wire;
a tape member covering the core electric wire; and
a covering layer covering the tape member;
wherein:
the core electric wire includes a plurality of insulated electric wires;
the insulated electric wires each include a conductor and an insulating layer covering the conductor;
the tape member is a film: and
the tape member has a breaking elongation of 50% or less.

In the electrically insulated cable of the present disclosure, the tape member covering the core electric wire is a film, and the tape member has a predetermined breaking elongation. Therefore, it is possible to provide an electrically insulated cable excellent in workability in exposing an insulated electric wire. As used herein, the term "film" means a thin film comprised of a high-molecular weight compound. The film is intended not to include paper (such as a Japanese paper or a western paper), a nonwoven fabric, a woven fabric or a knitted fabric. The term "workability" means the ease of making a work in various steps of connecting an electrically insulated cable to a predetermined device. Examples of the work include the work of removing a covering layer and a tape member to expose an insulated electric wire in an electrically insulated cable.

[2] The tape member preferably comprises at least one selected from the group consisting of a cellophane film, a microporous film, a uniaxially oriented film and a biaxially oriented film. By defining in this way, the electrically insulated cable becomes further excellent in the above-described workability.

[3] The thickness of the tape member is preferably no less than 3 μm and no more than 200 μm. By defining in this way, the electrically insulated cable becomes excellent in the stability to the outer diameter of the core electric wire in addition to the above-described workability.

[4] The softening point of the tape member is preferably more than 120° C. By defining in this way, the electrically insulated cable becomes excellent in the manufacturability of the cable in addition to the above-described workability.

[5] The covering layer preferably includes a first sheath layer covering the tape member and a second sheath layer covering the first sheath layer. By defining in this way, the electrically insulated cable can have an excellent impact resistance in addition to the above-described workability. As used herein, the term "impact resistance" means a resistance to damage to an electrically insulated cable due to an external impact.

[6] The plurality of insulated electric wires each have the same diameter, and the conductor in each of the plurality of insulated electric wires preferably has a cross-sectional area of no less than 1.5 mm² and no more than 3 mm². By defining in this way, the electrically insulated cable can have excellent electrical characteristics and an excellent flexing resistance.

[7] The electrically insulated cable is preferably an electrically insulated cable to be mounted on a vehicle. The electrically insulated cable can be suitably used to be mounted on a vehicle.

[8] The electrically insulated cable is preferably an electrically insulated cable for an electric parking brake. The electrically insulated cable can be suitably used for an electric parking brake.

[9] The electrically insulated cable is preferably an electrically insulated cable for an antilock brake system. The electrically insulated cable can be suitably used as an electrically insulated cable for an antilock brake system.

Details of Embodiments

Hereinafter, embodiments of the present disclosure (hereinafter referred to as "the present embodiment") will be described. However, the present embodiments are not limited thereto. As used herein, the expression in the form of "A to Z" means the upper limit and the lower limit of a range (that is, no less than A and no more than Z), and when there is no description of the unit for A and the unit is described only for Z, the unit for A is the same as the unit of Z.

<<Electrically Insulated Cable>>

The electrically insulated cable according to the present disclosure (hereinafter sometimes referred to only as "electrically insulated cable") is an electrically insulated cable comprising:

a core electric wire;

a tape member covering the core electric wire; and a covering layer covering the tape member;

wherein:

the core electric wire includes a plurality of insulated electric wires;

the insulated electric wires each include a conductor and an insulating layer covering the conductor;

the tape member is a film, and the tape member has a breaking elongation of 50% or less.

FIG. 1 is a cross-sectional view showing a configuration of an embodiment of the electrically insulated cable of the present disclosure. An electrically insulated cable 50 shown in FIG. 1 is used, for example, for an electric parking brake. Electrically insulated cable 50 comprises a core electric wire 14, a tape member 15 covering core electric wire 14, and a covering layer 18 covering tape member 15. In FIG. 1, core electric wire 14 includes two insulated electric wires 13. Two insulated electric wires 13 are bundled by winding tape member 15 around insulated electric wires 13 on the outer circumference thereof. Insulated electric wire 13 includes a conductor 11 and an insulating layer 12 covering conductor 11. Covering layer 18 includes a first sheath layer 16 covering tape member 15 and a second sheath layer 17 covering first sheath layer 16. Hereinafter, each of the components constituting the electrically insulated cable will be described.

<Core Electric Wire>

The core electric wire includes a plurality of insulated electric wires (also referred to as "insulated wires"). In other words, it can also be understood that an assembly of a plurality of insulated electric wires is a core electric wire. The core electric wire may be, for example, a twisted wire formed by twisting a plurality of the insulated electric wires.

The number of the insulated electric wires constituting the core electric wire is not particularly limited, but may be, for example, two, four or six. The diameters (outer diameters) of the plurality of insulated electric wires constituting the core electric wire may be each the same as or different from each other. For example, two or more insulated electric wires each having substantially the same diameter may be twisted together to form a core electric wire (for example, FIG. 1). A plurality of insulated electric wires having different diameters may be twisted together to form a core electric wire (for example, FIG. 2).

The core electric wire can include insulated electric wires for two or more applications. For example, insulated electric wires (two or more) for EPB having substantially the same diameter can be twisted together with an insulated electric wire(s) for a signal or grounding having a diameter smaller than the diameter of the insulated electric wire for EPB to form a single core electric wire.

(Insulated Electric Wire)

The insulated electric wire includes a conductor and an insulating layer covering the conductor. The term "conductor" as used in the present embodiment means a wire material comprised of a material having electrical conductivity, ductility and malleability. The material constituting the conductor is not particularly limited, but examples thereof include copper, aluminum, a copper alloy, tin-plated copper and an aluminum alloy. The conductor may be a single element wire or a twisted wire formed by twisting a plurality of (tens to hundreds of) element wires together. The conductor may be also a twisted twisted wire formed by further twisting such twisted wires together.

When the electrically insulated cable is used for power supply applications (for example, when used as a cable for EPB), the cross-sectional area of the conductor (in the case of being composed of a plurality of element wires, the total cross-sectional area thereof) is preferably no less than 1.5 mm$^2$ and no more than 3 mm$^2$, and more preferably no less than 1.6 mm$^2$ and no more than 2.5 mm$^2$.

When the electrically insulated cable is used for signal line applications (for example, when used as a cable for ABS), the cross-sectional area of the conductor is preferably no less than 0.13 mm$_2$ and no more than 0.5 mm$_2$, and more preferably no less than 0.18 mm$_2$ and no more than 0.35 mm$_2$. The cross-sectional area of the conductor can be determined by the following procedure. First, the diameter of each of the element wires (approximately 5 element wires) is measured using a micrometer gauge or the like, and the "average diameter of element wires" is calculated by averaging the diameters measured from each of the element wires. Next, the cross-sectional area per element wire is calculated from the calculated average diameter of element wires. At this time, the cross section perpendicular to the longitudinal direction of the element wire is assumed to be a circle to calculate the cross-sectional area thereof. The cross-sectional area of the conductor is determined by multiplying the calculated cross-sectional area by the number of element wires constituting the conductor.

In one aspect of the present embodiment, the plurality of insulated electric wires each have the same diameter, and the conductor in each of the plurality of insulated electric wires preferably has a cross-sectional area of no less than 1.5 mm$^2$ and no more than 3.0 mm$^2$. As used herein, the term "the same" is intended to include not only "completely the same" but also "substantially the same".

Examples of the material constituting the insulating layer include a polyolefin-based resin. The polyolefin-based resin is preferably a flame-retardant polyolefin-based resin. The flame-retardant polyolefin-based resin can be produced, for example, by blending a conventional polyolefin-based resin with a flame retardant. Due to the insulating layer being composed of the flame-retardant polyolefin-based resin, the flame retardant properties and the insulating properties of the core electric wire (insulated electric wire) can be ensured, even when a part of the core electric wire (insulated electric wire) is exposed by removing the covering layer or the tape member.

Examples of the polyolefin-based resin include, but not limited to, a high-density polyethylene (HDPE), a low-density polyethylene (LDPE), a linear low-density polyethylene (LLDPE), a very low-density polyethylene (VLDPE), an ethylene-vinyl acetate copolymer resin (EVA), an ethylene-methyl acrylate copolymer resin (EMA) and an ethylene-ethyl acrylate copolymer resin (EEA). Examples of the material constituting the insulating layer also include other materials such as a fluorine-based resin.

In the case of an insulated electric wire used for a cable for EPB, the thickness of the insulating layer is preferably no less than 0.2 mm and no more than 0.8 mm, and more preferably no less than 0.25 mm and no more than 0.7 mm. As used herein, the "thickness of the insulating layer" means the shortest distance from the inner wall of the insulating layer to the outer wall of the insulating layer. The thickness of the insulating layer can be determined as follows. First, the thickness of the insulating layer is measured at each of any 10 points using a slide caliper or a micrometer gauge. Next, the value calculated by averaging the thicknesses measured at each point is taken as the thickness of the insulating layer.

The outer diameter of the insulated electric wire is preferably no less than 2.5 mm and no more than 4 mm, and more preferably no less than 2.5 mm and no more than 3.8 mm. The outer diameter of the insulated electric wire can be measured, for example, with a slide caliper.

<Tape Member>

The tape member covers the core electric wire. In one aspect of the present embodiment, it can also be understood that the tape member is arranged between the core electric wire and the covering layer described later. It can also be understood that the tape member winds around the outer circumference of the core electric wire (the outer circumference of the assembly of insulated electric wires).

The tape member is a film. The breaking elongation of the tape member is 50% or less. By defining in this way, the tape member can be easily peeled off from the core electric wire by hand without being scattered around. As a result, the workability in exposing the insulated electric wire is improved. As used herein, the term "breaking elongation" means the rate of change (%) between the initial length of the tape member and the length after breaking of the tape member, in a tensile test on the tape member. The breaking elongation is calculated from the following formula. Breaking elongation (%)=100×{(length after breaking of tape member)−(initial length of tape member)}/(initial length of tape member)

The breaking elongation of the tape member is preferably no less than 0.1% and no more than 50%, and more preferably no less than 0.1% and no more than 25%.

The tensile test for determining the breaking elongation of the tape member is carried out according to the following procedure. The device to be used is the AGX Series Precision Universal Tester manufactured by Shimadzu Corporation. First, using a load cell having a load cell capacity of 50 N, a tape member having a width of 20 mm is held by a flat plate-shaped chuck jig so that the distance between chucks is 50 mm. Next, the tape member is pulled at a test speed of 50 mm/min, and the moving distance when the tape member breaks is measured.

The tape member is desired to have such strength that can prevent failure due to repeated flexing. The tape member usually winds around the outer circumference of the core electric wire, and in this case, ease of winding is desired. The thickness and shape (such as width) of the tape member and the material for forming the tape member are preferably selected in consideration of its strength and ease of winding. In one aspect of the present embodiment, the tape member may be colorless or transparent, or colored or opaque to visible light.

From the above viewpoint, examples of the material constituting the tape member include cellulose, polyethylene, polypropylene, polyethylene terephthalate and nylon. That is, the tape member preferably comprises at least one compound selected from the group consisting of cellulose, polyethylene, polypropylene, polyethylene terephthalate and nylon. Among them, the tape member more preferably comprises cellulose or polyethylene terephthalate. Examples of the tape member comprised of the cellulose include cellophane.

In one aspect of the present embodiment, the tape member is a film, the tape member comprises at least one compound selected from the group consisting of cellulose, polyethylene, polypropylene, polyethylene terephthalate and nylon, and the breaking elongation of the tape member is preferably 50% or less.

Heretofore, it has been common to use paper, a nonwoven fabric or the like as a tape member. When an electrically insulated cable is exposed to severe vibration conditions, the electrically insulated cable is required to have an excellent flexing resistance. However, when paper or a nonwoven fabric is used as the tape member, the tape member tends to be easily failed by repeatedly flexing the electrically insulating cable. The electrically insulated cable according to the present embodiment has such an excellent strength that can prevent failure due to repeated flexing by using the tape member having the above-described configuration. The electrically insulated cable comprising the tape member as described above is preferably used as an electrical insulating cable to be mounted on a vehicle that will be exposed to severe vibration conditions, particularly an electrically insulated cable for an electric parking brake or an electrically insulated cable for an antilock braking system.

In one aspect of the present embodiment, the tape member preferably comprises at least one selected from the group consisting of a cellophane film, a microporous film, a uniaxially oriented film and a biaxially oriented film. As used herein, the term "microporous film" means a film provided with a large number of pores having a pore size of 1 to 500 μm. The "uniaxially oriented film" means a film that has been subjected to tensile processing in a direction parallel to the winding direction of the film during formation of the film. The "biaxially oriented film" means a film that has been subjected to tensile processing both in a direction parallel to the winding direction of the film and in a direction perpendicular to the winding direction during formation of the film.

Each of the microporous film, uniaxially oriented film and biaxially oriented film may be produced by any known method or be obtained as a commercially available product.

The thickness of the tape member is preferably no less than 3 μm and no more than 200 μm. When the thickness is thinner than 3 μm, the tape member tends to be easily stretched when wound around the core electric wire on the outer circumference thereof. When the thickness is thicker than 200 μm, the rigidity of the tape member is high and the tape tends to easily spread even when wound, and the outer diameter of the covering layer that is covered after winding tends to become unstable. The thickness of the tape member can be measured, for example, by a micrometer gauge with a columnar spindle having a flat tip and a diameter of 10 mm. At this time, the thickness is first measured at each of any 10 points of the tape member, and the average value of the measured thicknesses is taken as the thickness of the tape member.

In addition, when the core electric wire is covered with the tape member and the covering layer is thereafter formed on the outer circumference of the tape member, for example, by melt extrusion of a resin which is the material for the covering layer, the tape member is desired not to be softened by the heating during the melt extrusion. Therefore, the tape member is preferably composed of a material having a melting point higher than that of the material constituting the covering layer. Specifically, the tape member is preferably composed of a material having a melting point of 160° C. or more, such as polyethylene terephthalate. When the melting point is less than 160° C., the tape member may be melted or deformed in the process of forming the covering layer on the outer circumference of the tape member.

In one aspect of the present embodiment, the softening point of the tape member is preferably more than 120° C. The softening point can be determined by a thermomechanical analyzer (TMA). The measurement conditions for measuring the softening point with TMA are as follows. First, the tape member is placed on a measuring table. Next, the temperature of the tape member is raised with the probe having a diameter of 3 mm pressed against the tape member with a load of 0.05 N in the thickness direction of the tape member. In the process of raising the temperature of the tape member, the temperature of the tape member is determined when the distance between the tip of the probe and the measuring table (this distance indicates the thickness of the tape member at the portion where the probe is pressed at that temperature) reaches 90% of the thickness of the tape member. The determined temperature is taken as the softening point of the tape member.

In one aspect of the present embodiment, the tape member preferably does not contain any fiber.

The tape member according to the present embodiment may contain a filler, an antioxidant, a processing aid or the like, as long as the effects of the present disclosure are exhibited. Examples of the filler include calcium carbonate and a flame retardant.

<Covering Layer>

The covering layer of the present disclosure covers the tape member. In one aspect of the present embodiment, the covering layer can also be understood to cover the outer circumference of the core electric wire bundled by the tape member. The covering layer protects the core electric wire. That is, the covering layer is required to be flexible to ensure resistance to stone splash or the like during driving a motor vehicle (impact resistance) and flexibility of the electrically insulated cable. The covering layer is also required to have an excellent flexing resistance or the like so as not to cause deterioration, such as disconnection and increase in resistance, of the conductor due to repeated flexing during traveling. In one aspect of the present embodiment, the covering layer may or may not be transparent to visible light.

Figure 3:
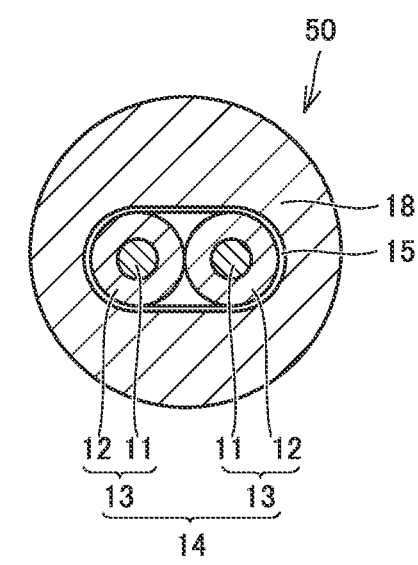
FIG. 3 is a cross-sectional view showing a configuration of further another embodiment of the electrically insulated cable of the present disclosure.

The covering layer may be composed of a single layer (see, for example, FIG. 3). In this case, any of a material constituting the first sheath layer described later and a material constituting the second sheath layer described later can be used as the material constituting the covering layer.

The covering layer may be composed of two or more layers. That is, the covering layer preferably includes a first sheath layer covering the tape member and a second sheath layer covering the first sheath layer. For example, an electrically insulated cable to be mounted on a vehicle such as a cable for EPB or a cable for ABS can have a two-layer structure in which a covering layer is comprised of a first sheath layer covering a tape member (core electric wire) and a second sheath layer covering the first sheath layer (see FIGS. 1 and 2).

(First Sheath Layer)

In order to improve the flexibility of the electrically insulated cable, the material constituting the first sheath layer is preferably a material excellent in flexibility. Particularly, when the elastic modulus of the first sheath layer in a low temperature environment is large, the flexing resistance of the electrically insulated cable in a low temperature environment tends to decrease. Therefore, in order to improve the flexing resistance of the electrically insulated cable in a low temperature environment, the material for the first sheath layer to be used is preferably a material flexible in a low temperature environment. In the case of the electrically insulated cable to be mounted on a vehicle, the material for the first sheath layer is further desired to be excellent in wear resistance, heat resistance or the like and it is often also desired to have flame retardance.

Examples of the material constituting the first sheath layer include a polyolefin-based resin such as polyethylene or an ethylene-vinyl acetate copolymer resin (EVA), a polyurethane elastomer, a polyester elastomer and a resin obtained by mixing these. By forming the first sheath layer out of a polyolefin-based resin, the electrically insulated cable can be improved in flexibility and flexing resistance in a low temperature environment. By forming the first sheath layer out of a polyurethane elastomer, the electrically insulated cable can be improved in wear resistance. By forming the first sheath layer out of a polyester elastomer, the electrically insulted cable can be also improved in heat resistance. Among the above-described resins, the polyethylene-based resin is particularly preferred from the viewpoint of a manufacturing cost and the like.

The material constituting the first sheath layer to be used can be a resin containing very low-density polyethylene (VLDPE) as a main component and having a small ratio between the elastic modulus in a low temperature environment and the elastic modulus in a high temperature environment. By using such a resin, it is possible to manufacture an electrically insulated cable having an excellent flexing resistance in a wide temperature range from room temperature to a low temperature. The resin containing VLDPE as a main component may be blended with other resins such as EVA, an ethylene-ethyl acrylate copolymer resin (EEA) and an acid-modified VLDPE, as long as the effects of the present disclosure are exhibited.

The material for forming the first sheath layer may contain various additives such as an antioxidant, a colorant and a flame retardant, as long as the effects of the present disclosure are exhibited.

When the electrically insulated cable is a power wire (such as a cable for EPB) used for power supply applications, the thickness of the first sheath layer is usually preferably no less than 0.3 mm and no more than 1.5 mm and more preferably no less than 0.45 mm and no more than 1.2 mm. As used herein, the "thickness of the first sheath layer" means the shortest distance from the inner wall of the first sheath layer to the outer wall of the first sheath layer. The thickness of the first sheath layer can be measured using a slide caliper or a micrometer gauge in the same manner as described above (average value of 10-point measurements). (Second Sheath Layer)

The second sheath layer covers the above-described first sheath layer. In one aspect of the present embodiment, the second sheath layer can also be understood to be the outermost sheath layer of the electrically insulated cable. In the case of an electrically insulated cable (such as a cable for EPB) to be mounted on a vehicle, it is subject to damage by stone splash or the like during traveling. In order to prevent the damage, the material constituting the second sheath layer is desired to be a resin excellent in flaw resistance and wear resistance. In addition, in order to make the electrically insulated cable flexible, the material constituting the second sheath layer is desired to be a material excellent in flexibility. Furthermore, when the electrically insulated cable is desired to have flame retardance, the second sheath layer is desired to have a high flame retardance.

Therefore, the material constituting the second sheath layer to be used is preferably a polyurethane-based resin such as a flame-retardant polyurethane resin, from the viewpoint of flaw resistance, flexibility and the like.

When the electrically insulated cable is a power wire (such as a cable for EPB) used for power supply applications, the thickness of the second sheath layer is usually preferably no less than 0.3 mm and no more than 0.7 mm. As used herein, the "thickness of the second sheath layer" means the shortest distance from the inner wall of the second sheath layer to the outer wall of the second sheath layer. The thickness of the second sheath layer can be measured using a slide caliper or a micrometer gauge in the same manner as described above (average value of 10-point measurements).

Embodiments of Electrically Insulated Cable of the Present Disclosure

Hereinafter, more specific embodiments of the above-described electrically insulated cable will be described.

Embodiment 1

FIG. 1 is a cross-sectional view showing Embodiment 1 of the electrically insulated cable of the present disclosure. An electrically insulated cable 50 shown in FIG. 1 is an electrically insulated cable used as a cable for EPB. Electrically insulated cable 50 has a core electric wire 14 formed by twisting together two twisted insulated electric wires 13. A covering layer 18 covering core electric wire 14 is comprised of a first sheath layer 16 and a second sheath layer 17.

In FIG. 1, insulated electric wires 13 are each comprised of a conductor 11 and an insulating layer 12 covering conductor 11. Conductor 11 is a twisted wire formed by twisting together approximately 400 element wires, made of a copper alloy, having an outer diameter of approximately 0.1 mm. The outer diameter of conductor 11 is approximately 2 mm to 3 mm. Insulating layer 12 comprised of a flame-retardant polyethylene covers conductor 11 on the outer circumference thereof. The thickness of insulating layer 12 is approximately 0.3 mm. Core electric wire 14 is formed by twisting together the two insulated electric wires 13 thus formed.

A tape member 15 is spirally wound around core electric wire 14 on the outer circumference thereof to cover the entire outer circumference of core electric wire 14. The breaking elongation of tape member 15 is 50% or less. Tape member 15 is a transparent tape having a width of approximately 5 mm and a thickness of approximately 0.033 mm. A cellophane film is used as tape member 15. Tape member 15 has such flexibility that enables easy winding, and such strength that is not easily failed by flexing an electrically insulating cable or the like. In addition, a material to be used for tape member 15 is preferably a material that is not softened by heat during formation of covering layer 18 (during melt extrusion of a resin).

First sheath layer 16 is comprised of polyethylene. The thickness of first sheath layer 16 is approximately 0.6 mm. Second sheath layer 17 is comprised of polyurethane. The thickness of second sheath layer 17 is approximately 0.5 mm. The material constituting first sheath layer 16 is not limited to polyethylene, but the material to be used is preferably a resin that improves flame retardance, wear resistance and flexing resistance (flexibility) of the electrically insulated cable. The material constituting second sheath layer 17 is not limited to polyurethane, but the material to be used is preferably a resin excellent in flame retardance, flaw resistance and flexing resistance (flexibility). The outer diameter of electrically insulated cable 50 is approximately 6 mm to 10 mm.

Embodiment 2

Figure 2:
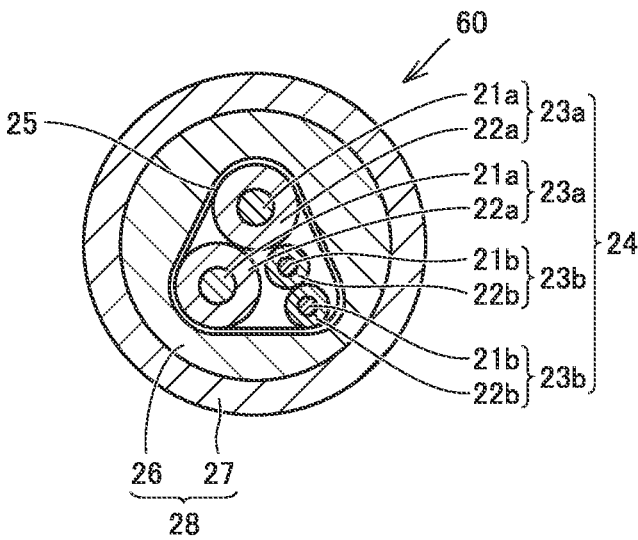
FIG. 2 is a cross-sectional view showing a configuration of another embodiment of the electrically insulated cable of the present disclosure.

FIG. 2 is a cross-sectional view showing another example of the embodiment of the electrically insulated cable of the present disclosure. An electrically insulated cable 60 shown in FIG. 2 is an electrically insulated cable used as a cable for EPB and ABS. Electrically insulated cable 60 has a core electric wire 24 formed by twisting together four insulated electric wires (two insulated electric wires 23a and two insulated electric wires 23b). A covering layer 28 covering core electric wire 24 is comprised of a first sheath layer 26 and a second sheath layer 27.

In FIG. 2, insulated electric wires 23a are each comprised of a conductor 21a and an insulating layer 22a covering conductor 21a. Conductor 21a is a twisted wire formed by twisting together approximately 400 element wires, made of a copper alloy, having an outer diameter of approximately 0.1 mm. The outer diameter of conductor 21a is approximately 2 mm to 4 mm. Insulating layer 22a comprised of a flame-retardant polyethylene and having a thickness of approximately 0.3 mm covers conductor 21a on the outer circumference thereof. Insulated electric wire 23a transmits electric power for EPB. On the other hand, insulated electric wires 23b are each comprised of a conductor 21b and an insulating layer 22b covering conductor 21b. Conductor 21b is a twisted wire formed by twisting together 48 element wires, made of a copper alloy, having an outer diameter of approximately 0.1 mm. The outer diameter of conductor 21b is approximately 1.2 mm to 2.0 mm. Insulating layer 22b comprised of a flame-retardant polyethylene and having a thickness of approximately 0.1 mm to 0.5 mm covers conductor 21b on the outer circumference thereof. Insulated electric wire 23b transmits electric power for ABS. Core electric wire 24 is formed by twisting together the two insulated electric wires 23a and the two insulated electric wires 23b thus formed.

A tape member 25 is spirally wound around core electric wire 24 on the outer circumference thereof to cover the entire outer circumference of core electric wire 24. The breaking elongation of tape member 25 is 50% or less. Tape member 25 to be used can be a tape having the same width and thickness as the tape member 15 of Example 1 of the embodiment. The same material as the material for forming tape member 15 can be used as a material for forming tape member 25.

The thickness of first sheath layer 26 can be as the same thickness as that of first sheath layer 16 of Example 1 of the embodiment. In addition, the same material as the material for forming first sheath layer 16 can be used as a material for forming first sheath layer 26. The thickness of second sheath layer 27 can be as the same thickness as that of second sheath layer 17 of Example 1 of the embodiment. In addition, the same material as the material for forming second sheath layer 17 can be used as a material for forming second sheath layer 27. The outer diameter of electrically insulated cable 60 is approximately 6 mm to 10 mm.

Hereinbefore, the electrically insulated cable according to the present embodiment has been described in detail. The above-described electrically insulated cable is used as a member for making an electrical connection in various devices. The above-described electrically insulated cable is suitably used as an electrically insulated cable to be mounted on a vehicle, particularly as a cable that is used in such applications as an electric parking brake (EPB) system and an antilock brake system (ABS). That is, the above-described electrically insulated cable is preferably an electrically insulated cable for an electric parking brake. In addition, the above-described electrically insulated cable is preferably an electrically insulated cable for an antilock brake system.

<<Manufacturing Method of Electrically Insulated Cable>>

Figure 4:
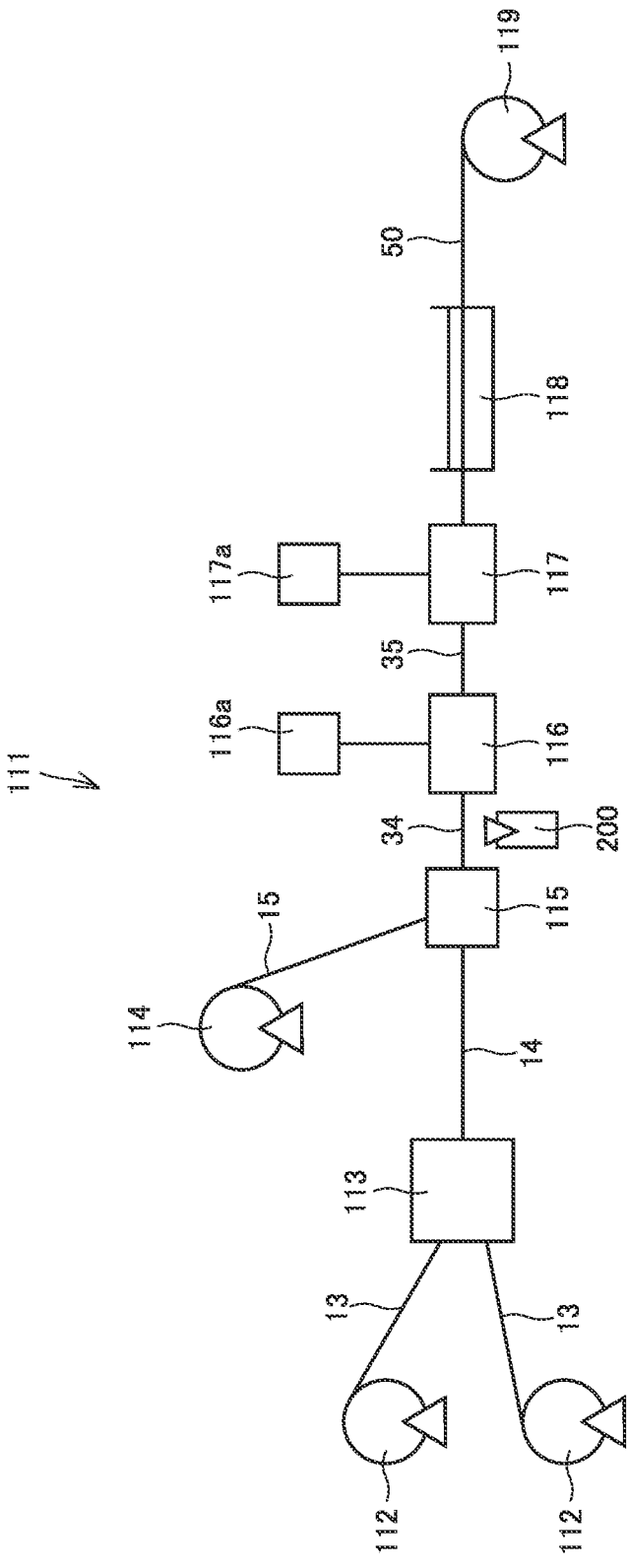
FIG. 4 is a schematic configuration diagram showing a manufacturing apparatus for manufacturing an electrically insulated cable according to one aspect of the present embodiment.

Next, a method for manufacturing an electrically insulated cable of the present disclosure will be described. FIG. 4 is a schematic configuration diagram showing a manufacturing apparatus for manufacturing an electrically insulated cable according to one aspect of the present embodiment. As shown in FIG. 4, a manufacturing apparatus 111 comprises two insulated electric wire supply reels 112, a twisting section 113, a tape member supply reel 114, a tape member-winding section 115, a first sheath layer-covering section 116, a second sheath layer-covering section 117, a cooling section 118, and an electrically insulated cable winding reel 119.

An insulated electric wire 13 is wound around each of two insulated electric wire supply reels 112, and two insulated electric wires 13 are supplied to twisting section 113. Here, insulated electric wire 13 can be manufactured by covering conductor 11 as described above on the outer circumference thereof with an insulating resin which is a material constituting an insulating layer 12 (hereinafter sometimes referred to as "insulating resin"). Covering with the insulating resin can be carried out by the same method as in the case of manufacturing any known insulated electric wire, for example, by melt extruding the insulating resin. After the insulating layer is formed, the resin forming the insulating layer may be crosslinked, for example, by irradiating it with ionizing radiation in order to improve the heat resistance of the insulating layer.

In twisting section 113, two insulated electric wires 13 supplied are twisted together to form a core electric wire 14. This core electric wire 14 is transferred to tape member-winding section 115.

In tape member-winding section 115, core electric wire 14 transferred from twisting section 113 and tape member 15 supplied from tape member supply reel 114 are merged, and tape member 15 is spirally wound around core electric wire 14 on the outer circumference thereof to form a tape-wound core electric wire 34. This tape-wound core electric wire 34 is transferred to a first sheath layer-covering section 116. Here, when tape member 15 is transparent to visible light, an imaging device 200 may be arranged between tape member-winding section 115 and first sheath layer-covering section 116. The state of insulated electric wire 13 in tape-wound core electric wire 34 can be observed by imaging device 200.

First sheath layer-covering section 116 is connected to a storage section 116a in which a resin material such as a polyolefin-based resin is stored. In first sheath layer-covering section 116, the resin material supplied from this storage section 116a is extruded on the outer circumference of tape-wound core electric wire 34 and covers tape-wound core electric wire 34. In this way, first sheath layer 16 is formed so as to cover tape-wound core electric wire 34 on the outer circumference thereof. First sheath layer 16-covered, tape-wound core electric wire 35 is transferred to a second sheath layer-covering section 117.

Second sheath layer-covering section 117 is connected to a storage section 117a in which a resin material such as a polyurethane-based resin is stored. In second sheath layer-covering section 117, the resin material supplied from this storage section 117a is extruded on the outer circumference of first sheath layer 16 formed by first sheath layer-covering section 116 and covers first sheath layer 16. In this way, second sheath layer 17 is formed so as to cover first sheath layer 16 on the outer circumference thereof, to form an electrically insulated cable 50 that is covered with a covering layer 18 of a bilayer structure comprised of first sheath layer 16 and second sheath layer 17. After second sheath layer 17 is formed, electrically insulated cable 50 may be irradiated with electron beam or the like in order to crosslink a resin of covering layer 18 and thereby improve the scratch resistance. This electrically insulated cable 50 is transferred to cooling section 118, in which covering layer 18 is cooled and cured, and thereafter transferred to cable winding reel 119 for winding.

The above description includes the features additionally noted below.

(Additional Note 1)

An electrically insulated cable comprising:

a core electric wire;

a tape member covering the core electric wire; and a covering layer covering the tape member;

wherein:

the core electric wire includes a plurality of insulated wires;

the insulated wires each include a conductor and an insulating layer covering the conductor;

the tape member is a film; and the tape member has a breaking elongation of 50% or less.

(Additional Note 2)

The electrically insulated cable according to additional note 1, wherein the tape member comprises at least one selected from the group consisting of a cellophane film, a microporous film, a uniaxially oriented film and a biaxially oriented film.

(Additional Note 3)

The electrically insulated cable according to additional note 1 or 2, wherein the tape member has a thickness of no less than 3 μm and no more than 200 μm.

(Additional Note 4)

The electrically insulated cable according to any of additional notes 1 to 3, wherein the tape member has a softening point of more than 120° C.

(Additional Note 5)

The electrically insulated cable according to any of additional notes 1 to 4, wherein the covering layer includes a first sheath layer covering the tape member and a second sheath layer covering the first sheath layer.

(Additional Note 6)

The electrically insulated cable according to any of additional notes 1 to 5, wherein the plurality of insulated wires each have the same diameter, and the cross-sectional area of the conductor in each of the plurality of insulated wires is no less than 1.5 mm² and no more than 3.0 mm².

Example

Hereinafter, the present disclosure will be specifically described based on the examples thereof, but the present invention will not be limited to the following examples.

<<Manufacturing of Electrically Insulated Cable>>

<Preparation of Materials>

The following materials were prepared to produce an electrically insulated cable.

1) A material for forming an insulating layer: a flame-retardant polyethylene-based resin (manufactured by RIKEN TECHNOS CORPORATION; trade name: ANQ9729T)

2) A material for forming a first sheath layer: a non flame-retardant polyethylene-based resin (manufactured by DuPont-Mitsui Polychemicals Co. Ltd. (presently, DOW-MITSUI POLYCHEMICALS CO., LTD.); trade name: EVAFLEX EV360)

3) A material for forming a second sheath layer: a non flame-retardant polyurethane-based resin (manufactured by BASF; trade name: Elastollan ET385)

4) A material for forming a tape member

A cellophane film: 20 μm in thickness (manufactured by Rengo Co., Ltd.)

A microporous film (PET): 14 μm in thickness (manufactured by J-Film Corporation)

A uniaxially oriented film (HDPE): 18 μm in thickness (manufactured by Denka Company Limited; trade name: Calalyan Y)

A thin paper: 33 μm in thickness (manufactured by Daio Paper Corporation; trade name: Rayon Paper PM)

A nonwoven fabric (a short fiber, PET): 33 μm in thickness (manufactured by TENTOK PAPER CO., LTD.: trade name: M25)

A nonwoven fabric (a long fiber—uncompressed, PET): 10 μm in thickness (manufactured by Toyobo Co., Ltd.; trade name: ECULE 3151B)

A nonwoven fabric (a long fiber—uncompressed, PET): 17 μm in thickness (manufactured by Toyobo Co., Ltd.; trade name: ECULE 3301B)

A PET film (normal): 14 μm in thickness (manufactured by Toray Industries, Inc.; trade name: Lumirror)

A PET film (easy tear type): 14 μm in thickness (manufactured by Toyobo Co., Ltd.; trade name: TEARFINE TF110)

An embossed film (HDPE): 25 μm in thickness (manufactured by Hayashikazuji Co., LTD.)

<Measurement of Breaking Elongation of Tape Member>

Breaking elongation was determined for the above-described tape member by the above-described method. Table 1 shows the breaking elongation actually determined.

<Production of Electrically Insulated Cable>

An element wire, made of a copper alloy, having an outer diameter of 0.08 mm was prepared. The fifty-two element wires were twisted together to produce a twisted wire. The seven twisted wires were twisted together to produce a conductor. The outside diameter of the conductor was 2.0 mm. A flame-retardant polyethylene-based resin was melt extruded on the conductor on the outer circumference thereof to form an insulating layer having a thickness of 0.3 mm, so as to produce an insulated electric wire.

The two insulated electric wires produced were twisted together to produce a core electric wire. Each of the tape members shown in Table 1 was spirally wound in one layer with a winding width of 3 mm around the produced core electric wire on the outer circumference thereof to cover the core electric wire on the outer circumference thereof with the tape member. A non-flame retardant polyethylene-based resin was melt extruded on the tape member-wound core electric wire on the outer circumference thereof and cover it, so as to form a first sheath layer having a thickness of 0.5 mm. Thereafter, a non-flame retardant polyurethane-based resin was melt extruded on the first sheath layer on the outer circumference thereof and cover it, so as to form a second sheath layer having a thickness of 0.5 mm. Samples of the electrically insulated cables with Sample Numbers 1 to 10 were prepared by the above procedure. Here, Sample Numbers 1 to 3 correspond to the examples. Sample Numbers 4 to 10 correspond to comparative examples.

<Workability Test>

Each of Sample Numbers 1 to 10 were tested for ease of peeling and scattering degree of the tape according to the following procedure. Based on the results of both tests, the workability was evaluated by assigning the evaluation rank according to the criteria shown below. The results are shown in Table 1.

(Evaluation Rank for Ease of Peeling)

Rank A: peelable by hand

Rank C: not peelable by hand; cutting with a cutter required (Evaluation Rank for Scattering Degree of Tape)

Rank A: not scattered

Rank B: not easily scattered

Rank C: decomposed into pieces and scattered to a large extent

16

The invention claimed is:

1. An electrically insulated cable comprising:
a core electric wire;
a tape member covering the core electric wire; and
a covering layer covering the tape member;
wherein:
the core electric wire includes a plurality of insulated electric wires;
the insulated electric wires each include a conductor and an insulating layer covering the conductor;
the tape member is a film; and
the tape member has a breaking elongation of 50% or less.

2. The electrically insulated cable according to claim 1, wherein the tape member comprises at least one selected from the group consisting of a cellophane film, a microporous film, a uniaxially oriented film and a biaxially oriented film.

TABLE 1

| Sample Number | | 1 | 2 | 3 | 4 | 5 | 6 | 7 | 8 | 9 | 10 |
|---|---|---|---|---|---|---|---|---|---|---|---|
| Tape member | Forming material | Cellophane film | Microporous film | Uniaxially oriented film | Thin paper | Nonwoven fabric (short fiber-PET) | Nonwoven fabric (long fiber-uncompressed, PET) | Nonwoven fabric (long fiber-uncompressed, PET) | PET film (normal) | PET film (easy tear type) | Embossed film |
| | Thickness (μm) | 20 | 14 | 18 | 33 | 33 | 10 | 17 | 14 | 14 | 25 |
| | Breaking elongation (%) | 5 | 17 | 23 | 1 | 5 | 12 | 20 | 79 | 100 | 449 |
| Workability | Ease of peeling | A | A | A | A | A | A | A | C | C | C |
| | Scattering degree of tape | A | A | A | C | B | B | B | A | A | A |

From the results shown in Table 1, it was found that the electrically insulated cables of Sample Numbers 1 to 3 are excellent in workability in exposing the insulated electric wires.

The embodiments and examples now disclosed are exemplary in all respects, and should be considered not to be restrictive. The scope of the present invention is defined by the claims rather than the embodiments and examples described above, and is intended to include the equivalents to the claims and all modifications within the scope of the claims.

REFERENCE SIGNS LIST 11, 21a, 21b: conductor; 12, 22a, 22b: insulating layer; 13, 23a, 23b: insulated electric wire; 14, 24: core electric wire; 15, 25: tape member; 16, 26: first sheath layer; 17, 27: second sheath layer; 18, 28: covering layer, 34: tape-wound core electric wire; 35: first sheath layer-covered, tape-wound core electric wire; 50, 60: electrically insulated cable; 111; manufacturing apparatus; 112: insulated electric wire supply reel; 113: twisting section; 114: tape member supply reel; 115: tape member-winding section; 116: first sheath layer-covering section; 117: second sheath layer-covering section; 116a, 117a: storage section; 118: cooling section; 119: electrically insulated cable winding reel; 200: imaging device.

3. The electrically insulated cable according to claim 1, wherein the tape member has a thickness of no less than 3 μm and no more than 200 μm.

4. The electrically insulated cable according to claim 1, wherein the tape member has a softening point of more than 120° C.

5. The electrically insulated cable according to claim 1, wherein the covering layer includes a first sheath layer covering the tape member and a second sheath layer covering the first sheath layer.

6. The electrically insulated cable according to claim 1, wherein the plurality of insulated electric wires each have the same diameter, and the conductor in each of the plurality of insulated electric wires has a cross-sectional area of no less than 1.5 mm$^2$ and no more than 3.0 mm$^2$.

7. The electrically insulated cable according to claim 1, which is an electrically insulated cable to be mounted on a vehicle.

8. The electrically insulated cable according to claim 7, which is an electrically insulated cable for an electric parking brake.

9. The electrically insulated cable according to claim 7, which is an electrically insulated cable for an antilock brake system.

* * * * *